US012165333B2

(12) United States Patent
Tanaka

(10) Patent No.: US 12,165,333 B2
(45) Date of Patent: Dec. 10, 2024

(54) IMAGE CAPTURING CONTROL APPARATUS, IMAGE CAPTURING APPARATUS, IMAGE CAPTURING CONTROL METHOD, AND STORAGE MEDIUM

(71) Applicant: CANON KABUSHIKI KAISHA, Tokyo (JP)

(72) Inventor: Ryo Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 17/743,301

(22) Filed: May 12, 2022

(65) Prior Publication Data

US 2022/0375104 A1 Nov. 24, 2022

(30) Foreign Application Priority Data

May 20, 2021 (JP) ................................ 2021-085337

(51) Int. Cl.
*G06T 7/20* (2017.01)
*G06T 7/70* (2017.01)
*G06V 40/10* (2022.01)
*H04N 23/611* (2023.01)
*H04N 23/695* (2023.01)
*H04N 23/80* (2023.01)

(52) U.S. Cl.
CPC .............. *G06T 7/20* (2013.01); *G06T 7/70* (2017.01); *G06V 40/10* (2022.01); *H04N 23/611* (2023.01); *H04N 23/695* (2023.01); *H04N 23/80* (2023.01); *G06T 2207/30201* (2013.01)

(58) Field of Classification Search
CPC ....................................................... H04N 19/00
USPC .......................................................... 348/169
See application file for complete search history.

(56) References Cited

U.S. PATENT DOCUMENTS 10,643,344 B1 * 5/2020 Chuah ................. H04N 23/698
2012/0119987 A1 * 5/2012 Im ......................... G06F 3/0304
345/156

FOREIGN PATENT DOCUMENTS

JP 2019201387 A 11/2019

* cited by examiner

*Primary Examiner* — Amir Shahnami
(74) *Attorney, Agent, or Firm* — Canon U.S.A., Inc., IP Division

(57) ABSTRACT

An image capturing control apparatus includes a processor and a memory storing executable instructions which, when executed by the processor, cause the image capturing apparatus to perform operations including detecting coordinates indicating each of a plurality of parts of an object from an image captured by an image capturing unit, correcting the detected coordinates to corrected coordinates for each of the plurality of parts calculated based on a preset magnification and relative position, generating a tracking coordinate based on a plurality of the corrected coordinates each indicating different parts of the object and a distance of the plurality of the corrected coordinates, the distance being within a threshold, and controlling an image capturing range of the image capturing unit based on the generated tracking coordinates.

10 Claims, 12 Drawing Sheets

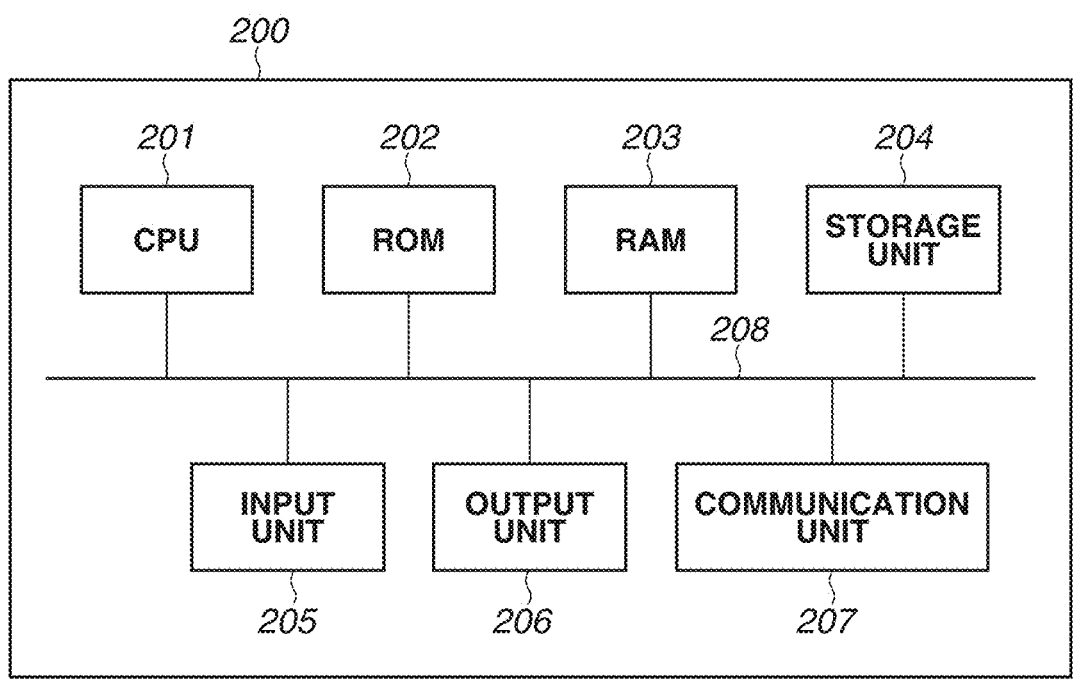

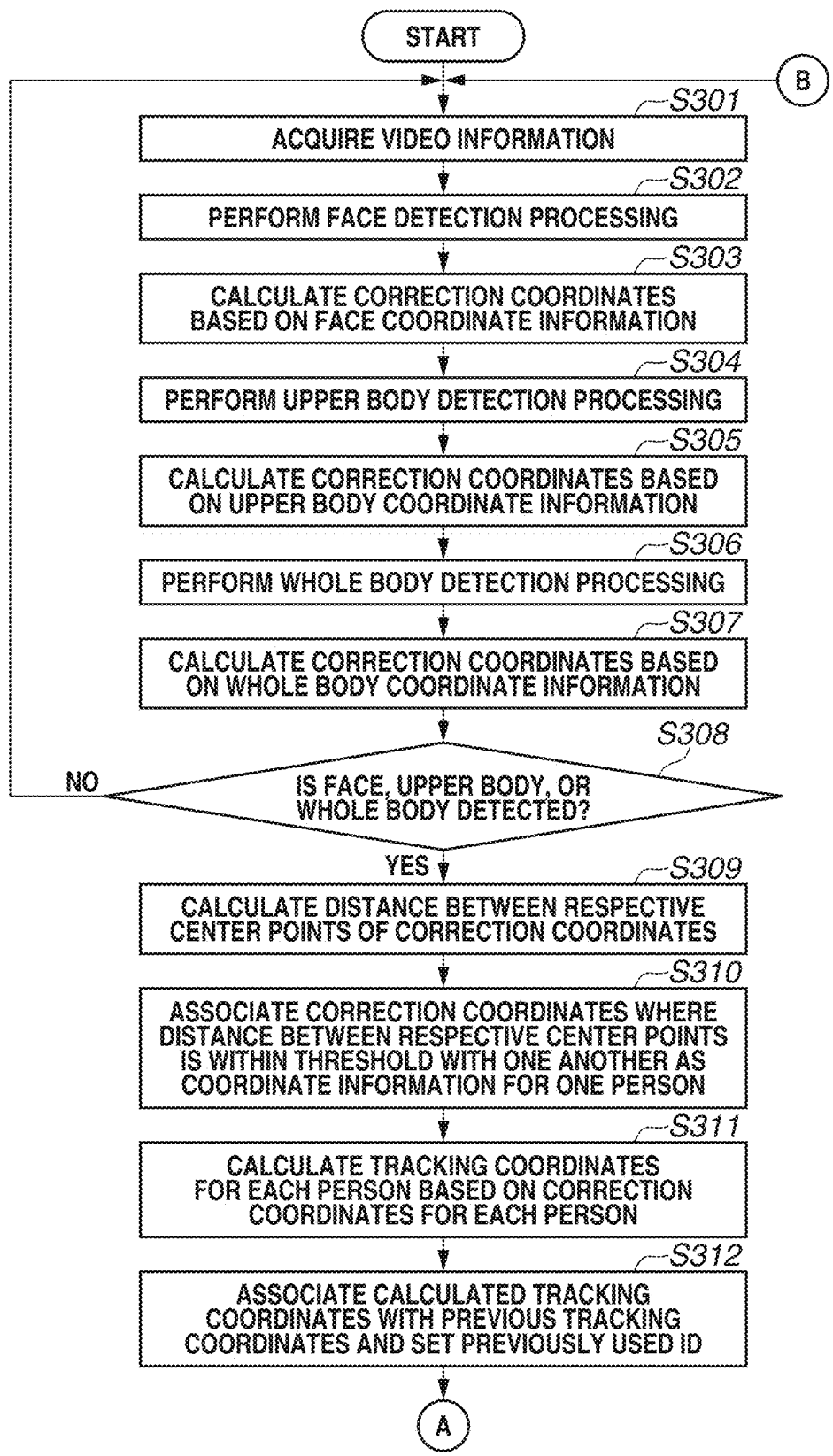

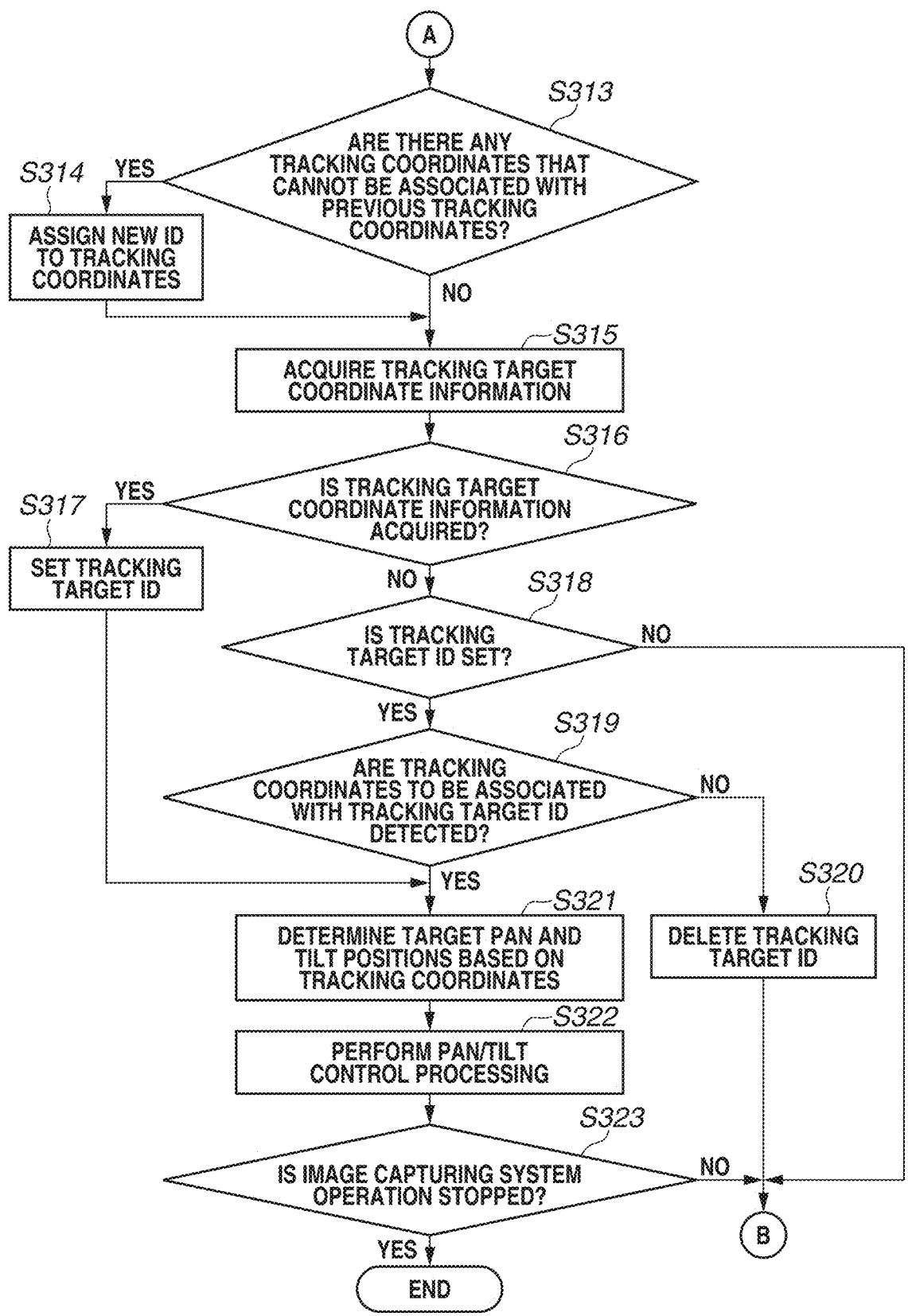

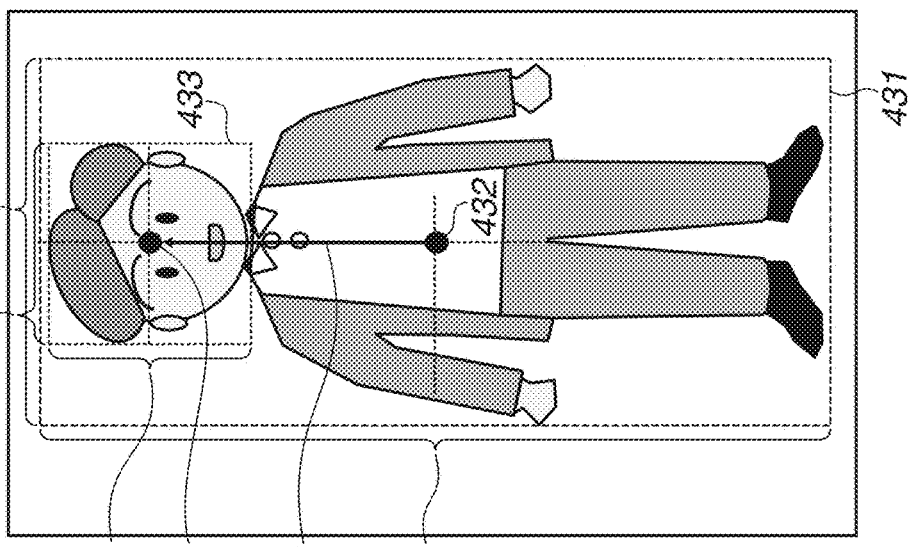
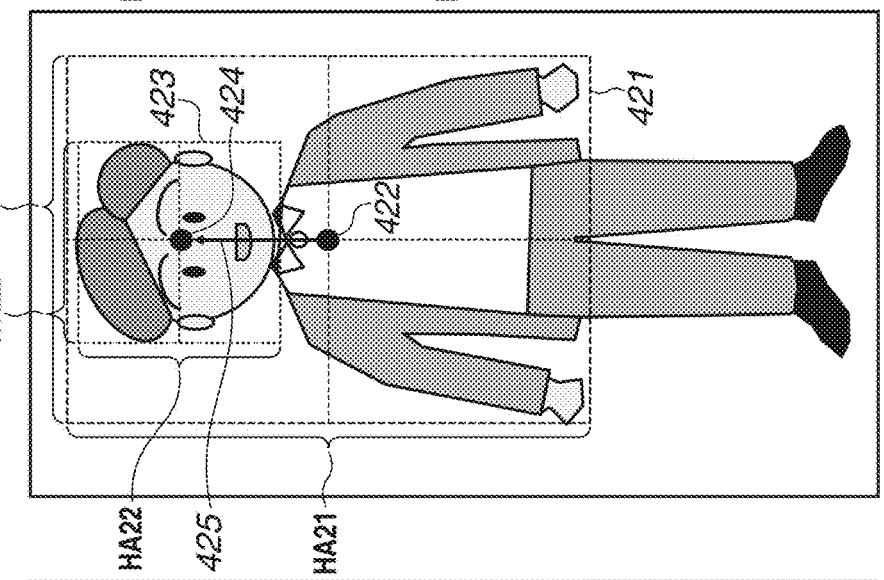
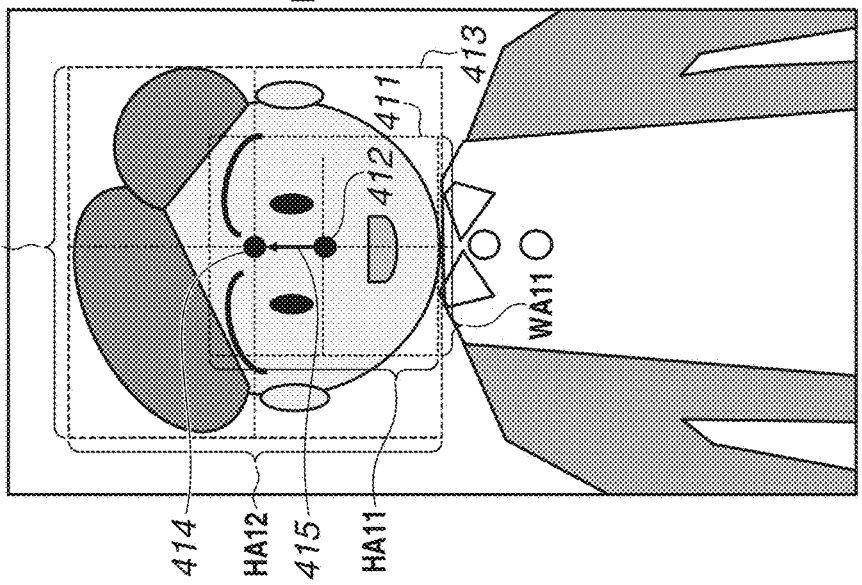

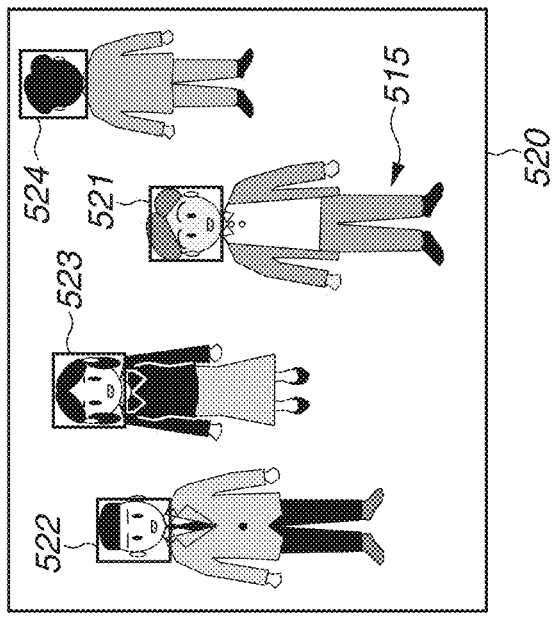
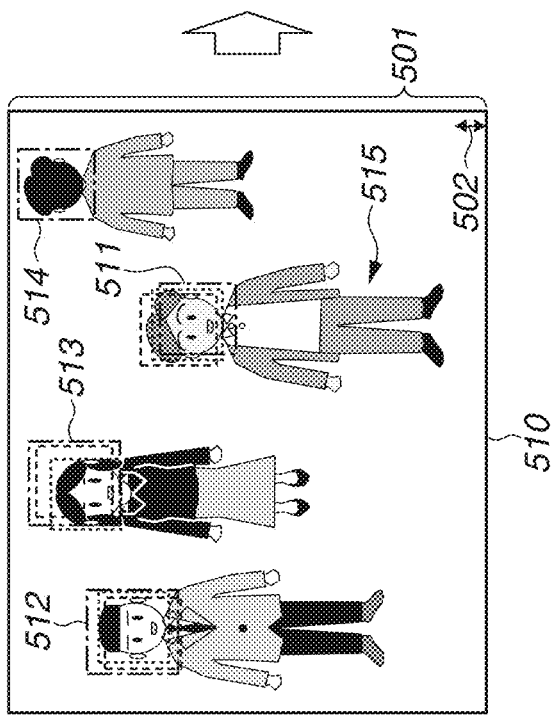

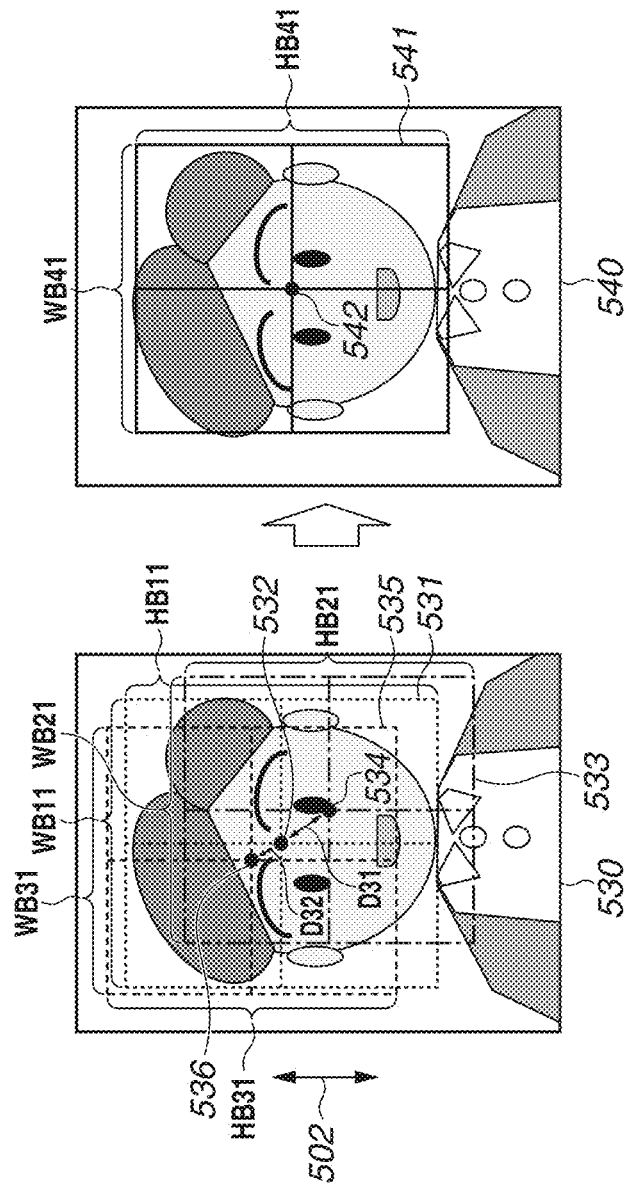

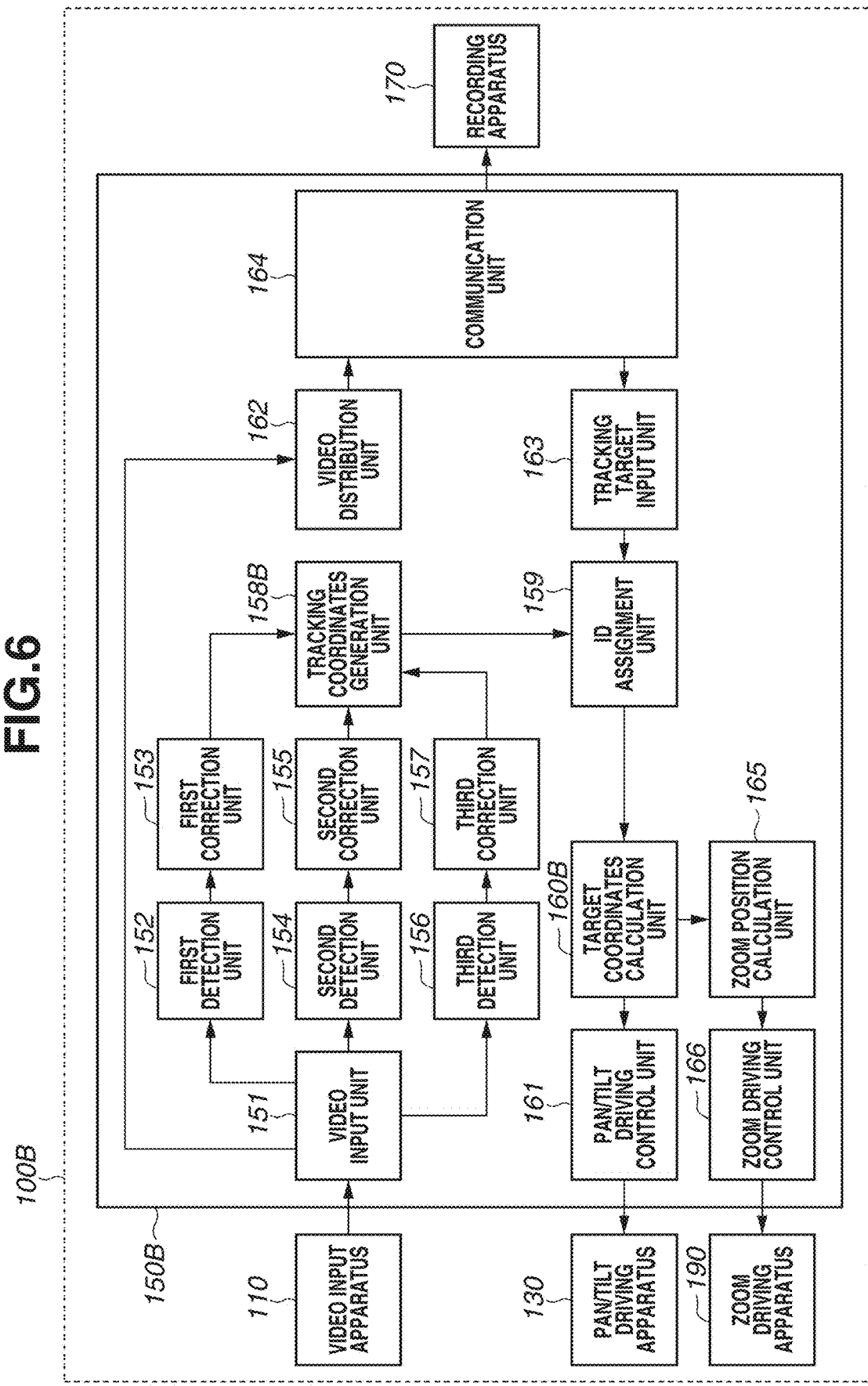

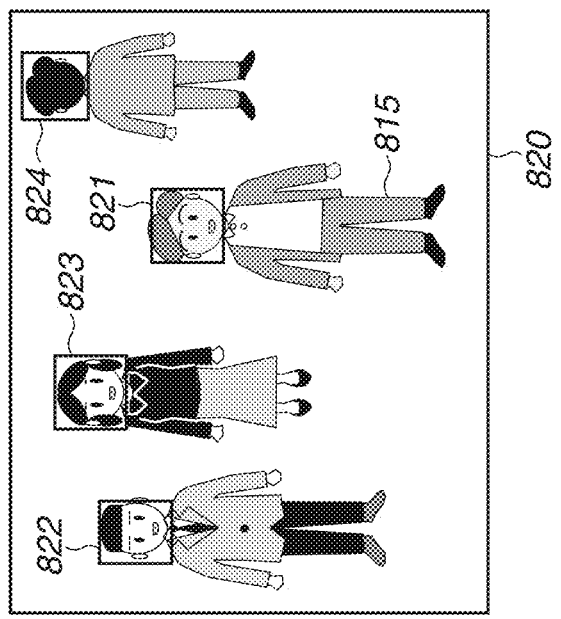
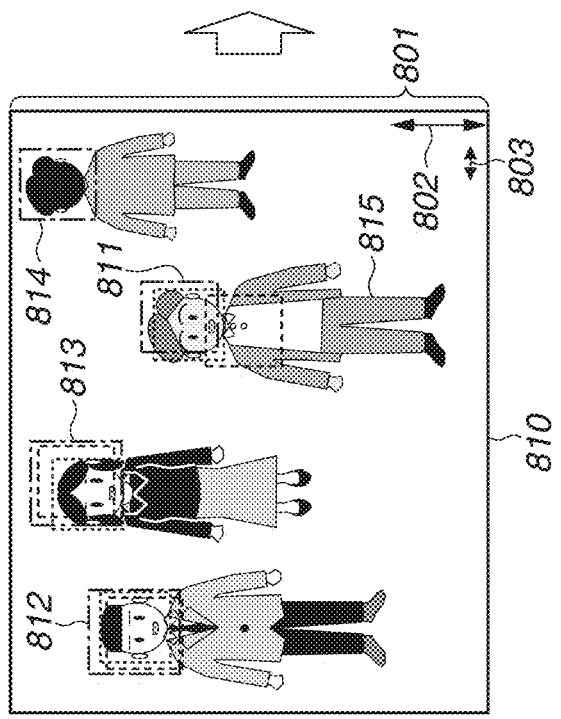

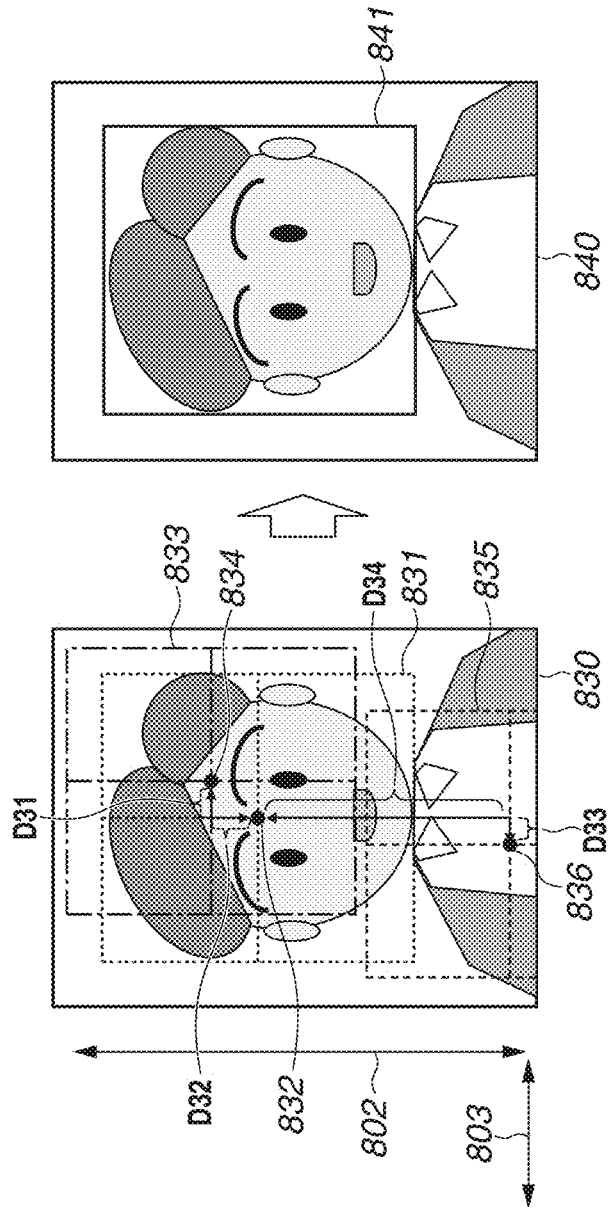

IMAGE CAPTURING CONTROL APPARATUS, IMAGE CAPTURING APPARATUS, IMAGE CAPTURING CONTROL METHOD, AND STORAGE MEDIUM

BACKGROUND

Field

The present disclosure relates to tracking of an object.

Description of the Related Art

An apparatus that detects an object through image analysis and tracks it with a camera may fail to track the object due to not detecting its specific part depending on the circumstances. To avoid that issue, there is known a technique for improving detection accuracy based on the detection of a plurality of parts. Japanese Patent Application Laid-Open No. 2019-201387 discusses a technique of registering features of the face part of an object and the peripheral part in the image in advance, determining that the parts that match the features registered in advance belong to the object, and tracking the object.

However, for the technique discussed in Japanese Patent Application Laid-Open No. 2019-201387, if the orientation and posture of the object change from those at the time when the features of the face part and the peripheral part in the image were registered, that affects the features in the image, failing to detect the object due to difficulty comparing the features, which may result in a failure in tracking the object.

SUMMARY

The present disclosure is directed to continuously tracking an object even if the features of the object on images change due to, for example, a change in the orientation of the object.

According to an aspect of the present disclosure, an image capturing control apparatus includes a processor and a memory storing executable instructions which, when executed by the processor, cause the image capturing apparatus to perform operations including detecting coordinates indicating each of a plurality of parts of an object from an image captured by an image capturing unit, correcting the detected coordinates to corrected coordinates for each of the plurality of parts calculated based on a preset magnification and relative position, generating a tracking coordinate based on a plurality of the corrected coordinates each indicating different parts of the object and a distance of the plurality of the corrected coordinates, the distance being within a threshold, and controlling an image capturing range of the image capturing unit based on the generated tracking coordinates.

Further features of the present disclosure will become apparent from the following description of exemplary embodiments with reference to the attached drawings.

BRIEF DESCRIPTION OF THE DRAWINGS

FIG. 2 is a block diagram illustrating a hardware configuration example of a tracking apparatus according to the first exemplary embodiment.

FIG. 3A is a flowchart illustrating an example of image capturing control processing according to the first exemplary embodiment.

FIG. 3B is a flowchart illustrating the example of image capturing control processing according to the first exemplary embodiment.

FIG. 4A illustrates a method of calculating correction coordinates according to the first exemplary embodiment.

FIG. 4B illustrates a method of calculating correction coordinates according to the first exemplary embodiment.

FIG. 4C illustrates a method of calculating correction coordinates according to the first exemplary embodiment.

FIG. 5A illustrates a method of generating tracking coordinates according to the first exemplary embodiment.

FIG. 5B illustrates a method of generating tracking coordinates according to the first exemplary embodiment.

FIG. 5C illustrates a method of generating tracking coordinates according to the first exemplary embodiment.

FIG. 5D illustrates a method of generating tracking coordinates according to the first exemplary embodiment.

FIG. 6 is a block diagram illustrating a configuration example of an image capturing system according to a second exemplary embodiment.

FIG. 8A illustrates a method of generating tracking coordinates according to the second exemplary embodiment.

FIG. 8B illustrates a method of generating tracking coordinates according to the second exemplary embodiment.

FIG. 8C illustrates a method of generating tracking coordinates according to the second exemplary embodiment.

FIG. 8D illustrates a method of generating tracking coordinates according to the second exemplary embodiment.

DESCRIPTION OF THE EMBODIMENTS

Some exemplary embodiments of the present disclosure will be described below with reference to the drawings. The configurations described in the following exemplary embodiments are merely examples, and the present disclosure is not limited to the illustrated configurations.

Figure 1:
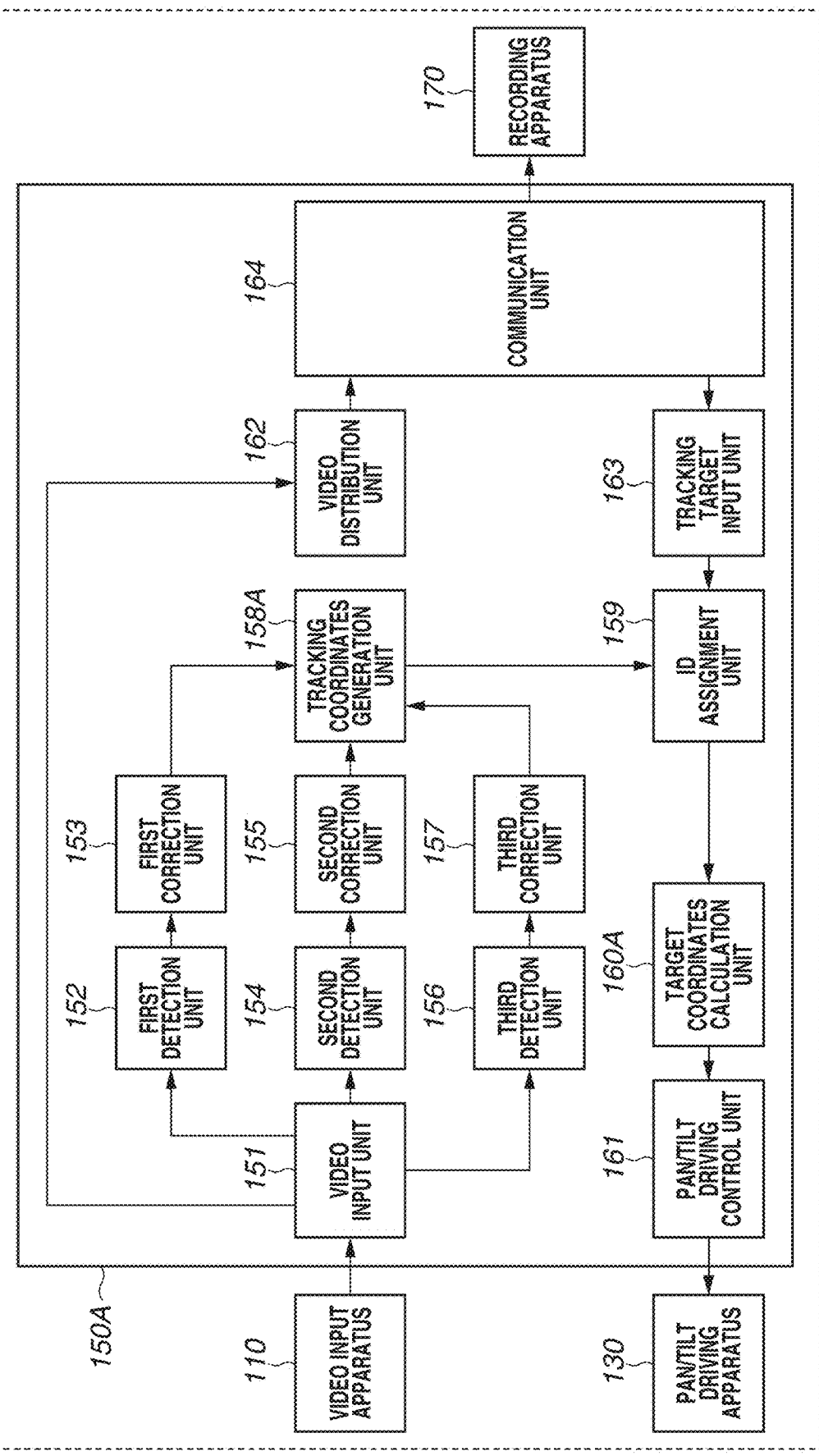
FIG. 1 is a block diagram illustrating a configuration example of an image capturing system according to a first exemplary embodiment.

FIG. 1 is a block diagram illustrating a functional configuration example of an image capturing system 100A including a tracking apparatus 150A as an image capturing control apparatus according to a first exemplary embodiment. The image capturing system 100A is a system that tracks a specific object designated by a user and performs automatic image capturing. The image capturing system 100A performs pan/tilt control processing so that the designated object to be tracked can be captured at an appropriate position within an angle of view (image capturing range), to track the object, and records a video image. Further, the image capturing system 100A detects a plurality of parts of the object through video analysis to identify the position of the object to be tracked. If at least one of the parts can be detected, the image capturing system 100A tracks the object based on the detected part, thereby improving the continuity of tracking. The following exemplary embodiment illustrates an example where a person is set as an object to be tracked and three parts of the person, which are the face, the upper body, and the whole body of the person, are detected. However, the object to be tracked and the parts to be detected are not limited to these examples.

The image capturing system 100A includes a video input apparatus 110, a pan/tilt driving apparatus 130, the tracking apparatus 150A, and a recording apparatus 170. The tracking apparatus 150A and the recording apparatus 170 are connected via a video interface. The video input apparatus 110 is an example of an image capturing unit that captures an image and generates image data. The tracking apparatus 150A is an example of an image capturing control apparatus that controls the image capturing unit (video input apparatus 110).

The video input apparatus 110, composed of a camera and other components, is an apparatus that captures an image of a peripheral area to generate a captured video image (image). The video input apparatus 110 can change the image capturing range. For example, the pan/tilt driving apparatus 130 performs at least one of a pan operation or a tilt operation, thereby making it possible to change the image capturing direction of the video input apparatus 110. The term "pan/tilt operation" used herein refers to an operation including at least one of the pan operation or the tilt operation. The video input apparatus 110 outputs the captured video image to the tracking apparatus 150A as video information.

The pan/tilt driving apparatus 130, composed of a motor, a gear, and other components, is an apparatus that changes the image capturing direction of the video input apparatus 110. Upon receiving a series of operation instructions for a pan/tilt operation from the tracking apparatus 150A, the pan/tilt driving apparatus 130 controls the motor based on the operation instructions to perform the pan/tilt operation.

The tracking apparatus 150A analyzes the video information received from the video input apparatus 110, and generates an operation instruction (pan/tilt operation instruction) for a pan/tilt operation so that the object to be tracked can be captured at a predetermined position within the angle of view. The tracking apparatus 150A performs processing for detecting the face, the upper body, and the whole body of the object to be tracked, and generates the pan/tilt operation instruction based on the detection result. The tracking apparatus 150A outputs the generated pan/tilt operation instruction to the pan/tilt driving apparatus 130 and outputs the video information to the recording apparatus 170.

The tracking apparatus 150A includes a video input unit 151, a first detection unit 152, a first correction unit 153, a second detection unit 154, a second correction unit 155, a third detection unit 156, a third correction unit 157, and a tracking coordinates generation unit 158A. The tracking apparatus 150A also includes an identification information (ID) assignment unit 159, a target coordinates calculation unit 160A, a pan/tilt driving control unit 161, a video distribution unit 162, a tracking target input unit 163, and a communication unit 164. The first detection unit 152, the second detection unit 154, and the third detection unit 156 are examples of a detection unit that detects coordinates indicating the area of a plurality of parts of an object. The first correction unit 153, the second correction unit 155, and the third correction unit 157 are examples of a correction unit that calculates correction coordinates of each part. The ID assignment unit 159 is an example of a setting unit that sets one set of tracking coordinates as a tracking target. The pan/tilt driving control unit 161 is an example of a control unit that controls the image capturing range.

In the present exemplary embodiment, assume that the first detection unit 152 and the first correction unit 153 perform processing for the face of the object. Also, assume that the second detection unit 154 and the second correction unit 155 perform processing for the upper body of the object, and that the third detection unit 156 and the third correction unit 157 perform processing for the whole body of the object.

The video input unit 151 inputs the video information (image) captured by the video input apparatus 110, and outputs the video information to the first detection unit 152, the second detection unit 154, the third detection unit 156, and the video distribution unit 162.

The first detection unit 152 performs processing for detecting a face in the image using the video information input from the video input unit 151. Examples of the face detection method include a template matching method and a face detection method using deep learning. Such detection methods are known techniques, and thus detailed descriptions thereof will be omitted. The first detection unit 152 outputs coordinate information indicating the detected face area (hereinafter also referred to simply as "face coordinate information") to the first correction unit 153. The coordinate information is output as absolute coordinates in a spherical coordinate system.

The first correction unit 153 calculates the correction coordinates of the face based on the face coordinate information input from the first detection unit 152. The first correction unit 153 performs scaling processing at a preset magnification and position correction processing at a preset relative position on the face coordinate information, thereby calculating the correction coordinates of the face. The first correction unit 153 outputs the face correction coordinate information to the tracking coordinates generation unit 158A.

An example of the method of calculating the correction coordinates of the face will now be described with reference to FIG. 4A. FIG. 4A illustrates a face area 411 indicated by the face coordinate information, center coordinates 412 of the face area 411, correction coordinates 413 of the face area, and center correction coordinates 414 of the face. The present exemplary embodiment illustrates an example where the calculation of the correction coordinates of the face are performed by shifting the center position upward by 35% and enlarging the face area in height and width directions by 180% according to the preset magnification and relative position based on the face coordinate information. The first correction unit 153 calculates a center movement distance by multiplying a height HA11 of the face area 411 by 0.35, and sets a point obtained by moving the center coordinates 412 of the face area 411 upward by the center movement distance as indicated by an arrow 415 as the center correction coordinates 414 of the face. Further, the first correction unit 153 calculates a height HA12 of the area indicated by the correction coordinates 413 of the face area by multiplying the height HA11 of the face area 411 by 1.8, and calculates a width WA12 of the area indicated by the correction coordinates 413 of the face area by multiplying a width WA11 of the face area 411 by 1.8.

The second detection unit 154 performs processing for detecting an upper body area in the image using the video information input from the video input unit 151. Examples of the upper body detection method include a template matching method and an upper body detection method using deep learning. Such detection methods are known techniques, and thus detailed descriptions thereof will be omitted. The second detection unit 154 outputs coordinate information indicating the detected upper body area (hereinafter also referred to simply as "upper body coordinate information") to the second correction unit 155.

The second correction unit 155 calculates the correction coordinates of the upper body based on the upper body coordinate information received from the second detection unit 154. The second correction unit 155 performs scaling processing at a preset magnification and position correction processing at a preset relative position on the upper body coordinate information, thereby calculating the correction coordinates of the upper body. The second correction unit 155 outputs the upper body correction coordinate information to the tracking coordinates generation unit 158A.

An example of the method for calculating the correction coordinates of the upper body will now be described with reference to FIG. 4B. FIG. 4B illustrates an upper body area 421 indicated by the upper body coordinate information, center coordinates 422 of the upper body area 421, correction coordinates 423 of the upper body area, and center correction coordinates 424 of the upper body. The present exemplary embodiment illustrates an example where the calculation of the correction coordinates of upper body are performed by shifting the center position upward by 30%, reducing the area in the height direction by 40%, and reducing the area in the width direction by 30% according to the preset magnification and relative position based on the upper body coordinate information.

The second correction unit 155 calculates a center movement distance by multiplying a height HA21 of the upper body area 421 by 0.3, and sets a point obtained by moving the center coordinates 422 of the upper body area 421 upward by the center movement distance as indicated by an arrow 425 as the center correction coordinates 424 of the upper body. Further, the second correction unit 155 calculates a height HA22 of the area indicated by the correction coordinates 423 of the upper body area by multiplying the height HA21 of the upper body area 421 by 0.4, and calculates a width WA22 of the area indicated by the correction coordinates 423 of the upper body area by multiplying a width WA21 of the upper body area 421 by 0.3.

The third detection unit 156 performs processing for detecting a whole body area in the image using the video information input from the video input unit 151. Examples of the whole body detection method include a template matching method and a whole body detection method using deep learning. Such detection methods are known techniques, and thus detailed descriptions thereof will be omitted. The third detection unit 156 outputs coordinate information indicating the detected whole body area (hereinafter also referred to simply as "whole body coordinate information") to the third correction unit 157. The coordinate information is output as absolute coordinates in a spherical coordinate system.

The third correction unit 157 calculates the correction coordinates of the whole body based on the whole body coordinate information received from the third detection unit 156. The third correction unit 157 performs scaling processing at a preset magnification and position correction processing at a preset relative position on the whole body coordinate information, thereby calculating the correction coordinates of the whole body. The third correction unit 157 outputs the whole body correction coordinate information to the tracking coordinates generation unit 158A.

An example of the method for calculating the correction coordinates of the whole body will now be described with reference to FIG. 4C. FIG. 4C illustrates a whole body area 431 indicated by the whole body coordinate information, center coordinates 432 of the whole body area 431, correction coordinates 433 of the whole body area, and correction coordinates 434 of the whole body. The present exemplary embodiment illustrates an example where the calculation of the correction coordinates of the whole body are performed by shifting the center position upward by 35%, reducing the area in the height direction by 20%, and reducing the area in the width direction by 30% according to the preset magnification and relative position based on the whole body coordinate information. The third correction unit 157 calculates a center movement distance by multiplying a height HA31 of the whole body area 431 by 0.35, and sets a point obtained by moving the center coordinates 432 of the whole body area 431 upward by the center movement distance as indicated by an arrow 435 as the center correction coordinates 434 of the whole body. Further, the third correction unit 157 calculates a height HA32 of the area indicated by the correction coordinates 433 of the whole body area by multiplying the height HA31 of the whole body area 431 by 0.2, and calculates a width WA32 of the area indicated by the correction coordinates 433 of the whole body area by multiplying the width WA31 of the whole body area 431 by 0.3.

Upon receiving the face correction coordinate information from the first correction unit 153, the upper body correction coordinate information from the second correction unit 155, and the whole body correction coordinate information from the third correction unit 157, the tracking coordinates generation unit 158A generates tracking coordinates based on the pieces of correction coordinate information. The tracking coordinates generation unit 158A outputs the generated tracking coordinates to the ID assignment unit 159.

A method in which the tracking coordinates generation unit 158A generates tracking coordinates will now be described with reference to FIGS. 5A to 5D. FIG. 5A illustrates a video image 510 that is captured with an image capturing angle of view of the image capturing system 100A, and coordinates 511, 512, 513, and 514 each indicating the correction coordinates of the face of each person set as an object, the correction coordinates of the upper body of each person, and the correction coordinates of the whole body of each person. The face correction coordinates, the upper body correction coordinates, and the whole body correction coordinates all are sometimes not detected depending on the conditions such as the orientation and posture of the person, and the presence or absence of the obstacle. The tracking coordinates generation unit 158A calculates the average position and size based on at least one of the correction coordinates of the face, the correction coordinates of the upper body, or the correction coordinates of the whole body, which can be detected, thereby generating tracking coordinates. An image 520 illustrated in FIG. 5B is an image obtained after tracking coordinates are generated. As indicated by coordinates 521, 522, 523, and 524, one set of tracking coordinates is generated for each person set as an object.

Further, a method of generating tracking coordinates will be described using a person 515 set as an object by way of example. Enlarged views 530 and 540 illustrated in FIGS. 5C and 5D, respectively, illustrate a peripheral area of the person 515. The enlarged view of FIG. 5C illustrates the correction coordinates of the face of the person 515, the correction coordinates of the upper body of the person 515, and the correction coordinates of the whole body of the person 515. The enlarged view of FIG. 5D illustrates the tracking coordinates of the person 515.

First, a method of extracting the correction coordinates for one person among all face correction coordinates, upper body correction coordinates, and whole body correction coordinates detected from a video image captured within the angle of view by the image capturing system 100A will be described with reference to FIG. 5C. FIG. 5C illustrates face correction coordinates 531, face center correction coordinates 532, upper body correction coordinates 533, upper body center correction coordinates 534, whole body correction coordinates 535, and whole body center correction coordinates 536.

If the distance between the areas indicated by the correction coordinates of the parts, specifically, the distance between the respective center points of two sets of correction coordinates, is within a determination threshold, the tracking coordinates generation unit 158A determines that the parts belong to the same person, and associates the two sets of correction coordinates as correction coordinates for one person with each other. In other words, if the distance between the center correction coordinates of two correction coordinates is within the determination threshold, the tracking coordinates generation unit 158A associates the two correction coordinates as correction coordinates for one person with each other. The determination threshold is a preset threshold for determining that each part indicated by correction coordinates belongs to the same person. In the example illustrated in FIG. 5C, a length 502 corresponding to 5% of a height 501 within the angle of view is set as the determination threshold. In the example illustrated in FIG. 5C, a distance D31 between two points corresponding to the face center correction coordinates 532 and the upper body center correction coordinates 534, respectively, is within the determination threshold. As a result, the tracking coordinates generation unit 158A associates the face correction coordinates 531 and the upper body correction coordinates 533 as correction coordinates for one person with each other. A distance D32 between two points corresponding to the face center correction coordinates 532 and the whole body center correction coordinates 536, respectively, is within the determination threshold. The tracking coordinates generation unit 158A associates the face correction coordinates 531 and the whole body correction coordinates 535 as correction coordinates for one person with each other. As a result, the face correction coordinates 531, the upper body correction coordinates 533, and the whole body correction coordinates 535 are associated as correction coordinates for the person 515 with one another.

Next, a method of generating tracking coordinates based on the sets of associated correction coordinates as described above will be described. The tracking coordinates generation unit 158A calculates the average size and position of the associated correction coordinates as correction coordinates for one person, thereby generating tracking coordinates. In the example illustrated in FIG. 5C, the correction coordinates 531, 533, and 535 are associated as correction coordinates for one person with one another. In this case, the tracking coordinates generation unit 158A calculates average values of X-coordinates and Y-coordinates of the center correction coordinates 532, 534, and 536, and sets a point located at the calculated average X-coordinate and average Y-coordinate as center coordinates 542 of tracking coordinates 541. Further, the tracking coordinates generation unit 158A sets the average value of a height HB11 of the area indicated by the face correction coordinates 531, a height HB21 of the area indicated by the upper body correction coordinates 533, and a height HB31 of the area indicated by the whole body correction coordinates 535 as a height HB41 of the area indicated by the tracking coordinates 541. Further, the tracking coordinates generation unit 158A sets the average value of a width WB11 of the area indicated by the face correction coordinates 531, a width WB21 of the area indicated by the upper body correction coordinates 533, and a width WB31 of the area indicated by the w % bole body correction coordinates 535 as a width WB41 of the area indicated by the tracking coordinates 541.

The ID assignment unit 159 assigns an ID to the tracking coordinates generated by the tracking coordinates generation unit 158A. The ID assignment unit 159 holds tracking coordinates generated based on an image of a previous frame (hereinafter referred to as "previous tracking coordinates") and the ID corresponding to the tracking coordinates. Upon receiving the tracking coordinates from the tracking coordinates generation unit 158A, the ID assignment unit 159 calculates the distance to the set of previous tracking coordinates for each set of tracking coordinates. The ID assignment unit 159 associates the previous tracking coordinates with the tracking coordinates where the distance between the coordinates is within a preset threshold, and sets the ID corresponding to the previous tracking coordinates as the current tracking coordinates. If there are tracking coordinates that are not associated with any of the previous tracking coordinates, the ID assignment unit 159 assigns and sets a new ID to the tracking coordinates. If the coordinate information about the tracking target is input from the tracking target input unit 163, the ID assignment unit 159 sets the tracking coordinates that are closest to the coordinates indicated by the coordinate information as the tracking target, and sets a tracking target ID. If the coordinate information about the tracking target is not input from the tracking target input unit 163 and the tracking target is not set yet, tracking processing is not performed. If there are no tracking coordinates to be associated with the tracking target ID even with the tracking target ID set, the ID assignment unit 159 determines that the tracking target is lost and deletes the tracking target ID, and tracking processing is not performed. With the tracking target ID set, the ID assignment unit 159 outputs the tracking coordinates associated with the tracking target ID to the target coordinates calculation unit 160A.

The target coordinates calculation unit 160A calculates target pan and tilt positions for the pan/tilt operation to capture the object to be tracked within the image capturing angle of view based on the tracking coordinates of the tracking target. If the tracking coordinates of the tracking target are input from the ID assignment unit 159, the target coordinates calculation unit 160A determines a target angle of view such that the center coordinates of the tracking coordinates are set at a predetermined position within the angle of view, and calculates the target pan and tilt positions to reach the target angle of view. The present exemplary embodiment illustrates an example where the target coordinates calculation unit 160A calculates, as the target angle of view, the angle of view where the X-coordinate of the center coordinates of the tracking coordinates is set at the center of the angle of view and the Y-coordinate of the center coordinates of the tracking coordinates is set at a position corresponding to 30% from the upper end of the angle of view, and calculates the target pan and tilt positions to reach the target angle of view. The target coordinates calculation unit 160A outputs information for driving to the calculated target pan and tilt positions to the pan/tilt driving control unit 161.

If the information for driving to the target pan and tilt positions is input from the target coordinates calculation unit 160A, the pan/tilt driving control unit 161 outputs a pan/tilt operation instruction for moving the image capturing direction to the target positions to the pan/tilt driving apparatus 130.

If video information is input from the video input unit 151, the video distribution unit 162 outputs the input video information to the communication unit 164. If coordinate information about the tracking target is input from the communication unit 164, the tracking target input unit 163 outputs the coordinate information about the tracking target to the ID assignment unit 159. The communication unit 164 outputs the video information input from the video distribution unit 162 to the recording apparatus 170. The communication unit 164 outputs the coordinate information about the object to be tracked that is input by the user through a user operation unit (not illustrated) to the tracking target input unit 163. The recording apparatus 170 performs processing for storing the input video image input from the tracking apparatus 150A into a storage device such as a hard disk drive (HDD).

FIG. 2 is a block diagram illustrating a hardware configuration example of a tracking apparatus according to the present exemplary embodiment. A tracking apparatus 200 according to the present exemplary embodiment includes a central processing unit (CPU) 201, a read-only memory (ROM) 202, a random access memory (RAM) 203, a storage unit 204, an input unit 205, an output unit 206, and a communication unit 207. The CPU 201, the ROM 202, the RAM 203, the storage unit 204, the input unit 205, the output unit 206, and the communication unit 207 are communicably connected via a system bus 208. The tracking apparatus 200 according to the present exemplary embodiment may further include units other than the above-described units.

The CPU 201 controls integrated operations of the tracking apparatus 200, and also controls the operations of the functional units connected via the system bus 208. The ROM 202 is a nonvolatile memory that stores control programs to be used for the CPU 201 to perform processing. Programs may be stored in the storage unit 204 or a storage medium detachably attached to the tracking apparatus 200. The RAM 203 functions as a main memory and a work area for the CPU 201. In performing processing, the CPU 201 reads out programs from the ROM 202 or other memories into the RAM 203, and runs the programs, thereby carrying out various functional operations.

The storage unit 204 stores various data and information to be used for the CPU 201 to perform processing using programs, for example. The storage unit 204 also stores various data and information obtained by the CPU 201 performing processing using programs or other pieces of data and information by way of example. The input unit 205 receives instructions through an operation unit (not illustrated) from the user of the tracking apparatus 200. For example, the input unit 205 receives an input of coordinate information about the tracking target based on a user operation. The output unit 206 outputs control information to an external apparatus from the tracking apparatus 200. For example, the output unit 206 outputs pan/tilt operation instructions to the pan/tilt driving apparatus 130. The communication unit 207 is an interface unit for communicating with an external apparatus (e.g., the recording apparatus 170).

Image capturing control processing performed in the image capturing system 100A according to the present exemplary embodiment will be described with reference to FIGS. 3A and 3B. FIGS. 3A and 3B are flowcharts each illustrating an example of image capturing control processing according to the present exemplary embodiment. As illustrated in FIG. 3A, when the image capturing system 100A is started by a user operation and automatic image capturing processing is started, in step S301, the video input unit 151 of the tracking apparatus 150A acquires video information from the video input apparatus 110.

In step S302, the first detection unit 152 of the tracking apparatus 150A analyzes the video image (image) input from the video input unit 151 and performs face detection processing on the video image. In step S303, the first correction unit 153 of the tracking apparatus 150A corrects the face coordinate information received from the first detection unit 152 at a preset magnification and relative position, thereby generating correction coordinates.

In step S304, the second detection unit 154 of the tracking apparatus 150A analyzes the video image (image) input from the video input unit 151 and performs upper body detection processing on the video image. In step S305, the second correction unit 155 of the tracking apparatus 150A corrects the upper body coordinate information received from the second detection unit 154 at a preset magnification and relative position, thereby generating correction coordinates.

In step S306, the third detection unit 156 of the tracking apparatus 150A analyzes the video image (image) input from the video input unit 151 and performs whole body detection processing on the video image. In step S307, the third correction unit 157 of the tracking apparatus 150A corrects the whole body coordinate information received from the third detection unit 156 at a preset magnification and relative position, thereby generating correction coordinates.

The processes of steps S302 to S307 related to face detection processing, upper body detection processing, and whole body detection processing on the object can be performed in no particular order. These processes may be performed in an order different from the order illustrated in FIG. 3A, or may be performed in parallel. The correction coordinates of each part may be generated after the processing of detecting all the parts is performed. For example, the face correction coordinates, the upper body correction coordinates, and the whole body correction coordinates of the object may be generated after the processing of detecting the face, the upper body, and the whole body of the object is performed.

In step S308, the tracking coordinates generation unit 158A of the tracking apparatus 150A determines whether the face, the upper body, or the whole body of the object is detected within the angle of view. If the tracking coordinates generation unit 158A determines that the face, the upper body, or the whole body of the object is detected within the angle of view (YES in step S308), the processing proceeds to step S309. Otherwise (NO in step S308), the processing returns to step S301.

In step S309, the tracking coordinates generation unit 158A calculates the distances between the respective center points of the sets of correction coordinates calculated in steps S303, S305, and S307.

In step S310, the tracking coordinates generation unit 158A associates the correction coordinates where the distances between the respective center points are within the determination threshold as coordinate information for one person with one another.

In step S311, the tracking coordinates generation unit 158A calculates the average size and position of the correction coordinates based on the face correction coordinates, the upper body correction coordinates, and the whole body correction coordinates of each person, thereby generating tracking coordinates.

In step S312, the ID assignment unit 159 of the tracking apparatus 150A associates the past tracking coordinates (previous tracking coordinates) with each set of tracking coordinates generated by the tracking coordinates generation unit 158A in step S311, and sets the previously used ID. Then, the processing proceeds to step S313 illustrated in FIG. 3B.

Next, in step S313, the ID assignment unit 159 determines whether there are any tracking coordinates that cannot be associated with the past tracking coordinates (previous tracking coordinates). If the ID assignment unit 159 determines that the tracking coordinates generated in step S311 cannot be associated with the previous tracking coordinates (YES in step S313), the processing proceeds to step S314. If the ID assignment unit 159 determines that the tracking coordinates generated in step S311 are associated with the previous tracking coordinates (NO in step S313), the processing proceeds to step S315.

In step S314, the ID assignment unit 159 assigns and sets anew ID to the tracking coordinates that cannot be associated with the past tracking coordinates (previous tracking coordinates), and then the processing proceeds to step S315.

In step S315, the ID assignment unit 159 acquires coordinate information about the tracking target from the tracking target input unit 163.

In step S316, the ID assignment unit 159 determines whether the coordinate information about the tracking target is acquired from the tracking target input unit 163. If the ID assignment unit 159 determines that the coordinate information about the tracking target is acquired (YES in step S316), the processing proceeds to step S317. If the ID assignment unit 159 determines that the coordinate information about the tracking target cannot be acquired (NO in step S316), the processing proceeds to step S318.

In step S317, the ID assignment unit 159 selects the tracking coordinates that are closest to the coordinate information about the tracking target acquired from the tracking target input unit 163, and sets the ID corresponding to the tracking coordinates as the tracking target ID. Then, the processing proceeds to step S321.

In step S318, the ID assignment unit 159 determines whether the tracking target ID is set. If the ID assignment unit 159 determines that the tracking target ID is set (YES in step S318), the processing proceeds to step S319. If the ID assignment unit 159 determines that the tracking target ID is not set (NO in step S318), the processing returns to step S301 illustrated in FIG. 3A.

In step S319, the ID assignment unit 159 determines whether tracking coordinates to be associated with the tracking target ID are detected in the tracking coordinates generated in step S311. If the ID assignment unit 159 determines that tracking coordinates to be associated with the tracking target ID are detected (YES in step S319), the processing proceeds to step S321. If the ID assignment unit 159 determines that tracking coordinates to be associated with the tracking target ID are not detected (NO in step S319), the processing proceeds to step S320.

In step S320, the ID assignment unit 159 deletes the set tracking target ID, and then the processing returns to step S301 illustrated in FIG. 3A.

In step S321, the target coordinates calculation unit 160A calculates the target pan and tilt positions for changing the image capturing range such that the tracking coordinates of the tracking target are located at a preset target position.

In step S322, the pan/tilt driving control unit 161 outputs a pan/tilt operation instruction for moving to the target pan and tilt positions calculated by the target coordinates calculation unit 160A to the pan/tilt driving apparatus 130, to thereby control the pan/tilt driving apparatus 130. As a result, the image capturing direction (image capturing range) of the video input apparatus 110 is controlled so that the object to be tracked can be captured at an appropriate position within the angle of view.

In step S323, the tracking apparatus 150A determines whether an image capturing system on/off switch (not illustrated) is operated by a user operation to stop the operation of the image capturing system. If the tracking apparatus 150A determines that an operation to stop the image capturing system is not performed (NO in step S323), the processing returns to step S301 illustrated in FIG. 3A. If the tracking apparatus 150A determines that an operation to stop the image capturing system is performed (YES in step S323), the operation of the image capturing system is completed.

As described above, the system for tracking a tracking target to capture it at an appropriate position within the angle of view and performing automatic image capturing detects a plurality of parts of an object through video analysis to identify the object to be tracked, and if at least one of the plurality of parts is detected, the system tracks the object based on the detected part, thereby improving the continuity of tracking. Further, tracking the object using coordinate information instead of image features enables continuous tracking even when the image features change due to, for example, changes in the orientation of the tracking target.

A second exemplary embodiment will be described. FIG. 6 is a block diagram illustrating a functional configuration example of an image capturing system 100B including a tracking apparatus 150B as an image capturing control apparatus according to the second exemplary embodiment. Like numbers refer to like components illustrated in FIG. 6 that have the same functions as those of the components illustrated in FIG. 1, and redundant descriptions will be omitted. The image capturing system 100B is a system that tracks a specific object designated by a user and performs automatic image capturing. The image capturing system 100B performs pan/tilt/zoom control processing to capture the designated object at an appropriate position within the angle of view (image capturing range) to track the object, and records a video image. The image capturing system 100B detects a plurality of parts of the object through video analysis to identify the position of the object to be tracked, and if at least one of the plurality of parts is detected, the image capturing system 100B tracks the object based on the detected part, thereby improving the continuity of tracking. As in the first exemplary embodiment, the second exemplary embodiment illustrates an example where a person is set as an object to be tracked, and where three parts of the person, which are the face, the upper body, and the whole body of the person, are detected. However, the object to be tracked and the parts to be detected are not limited to these examples. Additionally, in the present exemplary embodiment, to deal with characteristics of an upper body and a whole body, whose detected coordinates are likely to deviate in the longitudinal direction depending on the orientation and posture of the person, detected coordinates that deviate in the longitudinal direction are determined to be a result of a detected person. If the face of the object is successfully detected, the pan/tilt/zoom operation is controlled based on the coordinates of the face that are less likely to deviate as target coordinates, thereby improving the accuracy of controlling the angle of view.

The image capturing system 100B includes the video input apparatus 110, the pan/tilt driving apparatus 130, a zoom driving apparatus 190, the tracking apparatus 150B, and the recording apparatus 170. The tracking apparatus 150B and the recording apparatus 170 are connected via a video interface. The tracking apparatus 150B is an example of the image capturing control apparatus that controls the image capturing unit (video input apparatus 110).

The zoom driving apparatus 190 is an apparatus that changes the zoom magnification of the video input apparatus 110, and is composed of a motor, a gear, and other components. Upon receiving a series of operation instructions for the zoom operation from the tracking apparatus 150B, the zoom driving apparatus 190 controls the motor based on the operation instructions to perform the zoom operation.

The tracking apparatus 150B analyzes video information input from the video input apparatus 110, and generates an instruction (pan/tilt/zoom operation instruction) for performing at least one of the pan operation, the tilt operation, or the zoom operation to capture the object to be tracked at a predetermined position within the angle of view. The term "pan/tilt/zoom operation" used herein refers to an operation including at least one of the pan operation, the tilt operation, or the zoom operation. The tracking apparatus 150B performs face detection processing, upper body detection processing, and whole body detection processing on the object to be tracked, and generates the pan/tilt/zoom operation instruction based on the detection result. The tracking apparatus 150B outputs the generated pan/tilt operation instruction to the pan/tilt driving apparatus 130, outputs the generated zoom operation instruction to the zoom driving apparatus 190, and outputs the video information to the recording apparatus 170.

The tracking apparatus 150B includes the video input unit 151, the first detection unit 152, the first correction unit 153, the second detection unit 154, the second correction unit 155, the third detection unit 156, the third correction unit 157, and a tracking coordinates generation unit 158B. The tracking apparatus 150B also includes the ID assignment unit 159, a target coordinates calculation unit 160B, the pan/tilt driving control unit 161, a zoom position calculation unit 165, a zoom driving control unit 166, the video distribution unit 162, the tracking target input unit 163, and the communication unit 164. In the present exemplary embodiment, the pan/tilt driving control unit 161 and the zoom driving control unit 166 are examples of the control unit that controls the image capturing range.

Upon receiving face correction coordinate information from the first correction unit 153, upper body correction coordinate information from the second correction unit 155, and whole body correction coordinate information from the third correction unit 157, the tracking coordinates generation unit 158B generates tracking coordinates based on the pieces of correction coordinate information. The tracking coordinates generation unit 158B outputs the generated tracking coordinates to the ID assignment unit 159.

A method in which the tracking coordinates generation unit 158B generates tracking coordinates will now be described with reference to FIGS. 8A to 8D. FIG. 8A illustrates a video image 810 that is captured with the image capturing angle of view of the image capturing system 100B, and coordinates 811, 812, 813, and 814 each indicating the correction coordinates of the face of each person, the correction coordinates of the upper body of each person, and the correction coordinates of the whole body of each person set as an object. The face correction coordinates, the upper body correction coordinates, and the whole body correction coordinates all are sometime not be detected depending on the conditions such as the orientation and posture of the person, and the presence or absence of the obstacle. In the present exemplary embodiment, the reliability for the coordinates of the face, the upper body, and the whole body of each person is set. The tracking coordinates generation unit 158B uses the correction coordinates with higher reliability (highest reliability) that are detected between the face correction coordinates, the upper body correction coordinates, and the whole body correction coordinates as tracking coordinates. In the present exemplary embodiment, the sets of correction coordinates are selected in descending order of reliability, that is, the sets of correction coordinates are selected in the order of the face correction coordinates, the upper body correction coordinates, and the whole body correction coordinates. An image 820 illustrated in FIG. 8B is an image obtained after tracking coordinates are generated. As indicated by coordinates 821, 822, 823, and 824, one set of tracking coordinates is generated for each person set as an object.

Further, a method of generating tracking coordinates will be described using a person 815 set as an object by way of example. Enlarged views 830 and 840 illustrated in FIGS. 8C and 8D, respectively, illustrate the peripheral area of the person 815. The enlarged view of FIG. 8C illustrates the face correction coordinates, the upper body correction coordinates, and the whole body correction coordinates of the person 815. The enlarged view of FIG. 8D illustrates tracking coordinates for the person 815.

First, a method of extracting the correction coordinates for one person between all face correction coordinates, upper body correction coordinates, and whole body correction coordinates detected from a video image captured within the angle of view by the image capturing system 100B will be described with reference to FIG. 8C. FIG. 8C illustrates face correction coordinates 831, face center correction coordinates 832, upper body correction coordinates 833, upper body center correction coordinates 834, whole body correction coordinates 835, and whole body center correction coordinates 836. FIG. 8C illustrates a case where a deviation occurs in the detection of the coordinates of the whole body of the object, and the whole body correction coordinates 835 and the whole body center correction coordinates 836 are located at positions apart from the other coordinates.

As illustrated in FIG. 8C, the distance (lateral distance) between X-coordinates of two points of the face center correction coordinates 832 and the upper body center correction coordinates 834, respectively, is represented by D31, and the distance (longitudinal distance) between Y-coordinates of the two points is represented by D32. The distance (lateral distance) between X-coordinates of two points of the face center correction coordinates 832 and the whole body center correction coordinates 836, respectively, is represented by D33, and the distance (longitudinal distance) between Y-coordinates of the two points is represented by D34. In the present exemplary embodiment, if the distance between the X-coordinates of the respective areas (center points) indicated by two sets of correction coordinates is within a determination threshold and the distance between the Y-coordinates of the respective areas (center points) indicated by two sets of correction coordinates is within a determination threshold, the tracking coordinates generation unit 158B determines that the parts belong to the same person, and associates the two sets of correction coordinates as correction coordinates for one person with each other. In the present exemplary embodiment, a length 803 corresponding to 5% of a height 801 within the angle of view is set as the determination threshold in the X-coordinate (lateral direction), and a length 802 corresponding to 20% of the height 801 within the angle of view is set as the determination threshold in the Y-coordinate (longitudinal direction). The determination threshold in the Y-coordinate (longitudinal direction) is greater than the determination threshold in the X-coordinate (lateral direction).

In the example illustrated in FIG. 8C, the distance D31 between the X-coordinates of the face center correction coordinates 832 and the upper body center correction coordinates 834 is within the determination threshold, and the distance D32 between the Y-coordinates of the face center correction coordinates 832 and the upper body center correction coordinates 834 is within the determination threshold. As a result, the tracking coordinates generation unit 158B associates the face correction coordinates 831 and the upper body correction coordinates 833 as correction coordinates for one person with each other. Similarly, the distance D33 between the X-coordinates of the face center correction coordinates 832 and the whole body center correction coordinates 836 is within the determination threshold and the distance D34 between the Y-coordinates of the face center correction coordinates 832 and the whole body center correction coordinates 836 is within the determination threshold. As a result, the tracking coordinates generation unit 158B associates the face correction coordinates 831 and the whole body correction coordinates 835 as correction coordinates for one person with each other.

Next, a method of generating tracking coordinates based on each set of correction coordinates will be described. The tracking coordinates generation unit 158B sets tracking coordinates according to the reliability (priority) for each set of coordinates set for each of the plurality of parts of the object. In the present exemplary embodiment, if face correction coordinates are present, the face correction coordinates are set as tracking coordinates. If face correction coordinates are not present and upper body correction coordinates are present, the upper body correction coordinates are set as tracking coordinates. If face correction coordinates or upper body correction coordinates are not present, the whole body correction coordinates are set as tracking coordinates.

The target coordinates calculation unit 160B calculates target positions for the pan/tilt/zoom operation to capture the object to be tracked within the image capturing angle of view based on the tracking coordinates of the tracking target. Upon receiving the tracking coordinates of the tracking target from the ID assignment unit 159, the target coordinates calculation unit 160B calculates, as the target angle of view, the angle of view where the X-coordinate of the center coordinates of the tracking coordinates is set at the center of the angle of view and the Y-coordinate of the center coordinates of the tracking coordinates is set at a position corresponding to 30% from the upper end of the angle of view, and calculates the target pan and tilt positions to reach the target angle of view. The target coordinates calculation unit 160B outputs information for driving to the calculated target pan and tilt positions to the pan/tilt driving control unit 161. Further, the target coordinates calculation unit 160B outputs the tracking coordinates of the tracking target to the zoom position calculation unit 165.

Upon receiving the tracking coordinates of the tracking target from the target coordinates calculation unit 160B, the zoom position calculation unit 165 calculates, as the target zoom position, the zoom position where the height of the area indicated by the tracking coordinates is located at a position corresponding to 10% of the height within the angle of view. The zoom position calculation unit 165 outputs information for driving to the calculated target zoom position to the zoom driving control unit 166.

Upon receiving the information for driving to the target zoom position from the zoom position calculation unit 165, the zoom driving control unit 166 outputs the zoom operation instruction for moving to the target zoom position to the zoom driving apparatus 190.

The other components are similar to those of the image capturing system according to the first exemplary embodiment. The hardware configuration of the tracking apparatus is also similar to that of the first exemplary embodiment, and thus the description thereof will be omitted.

Figure 7A:
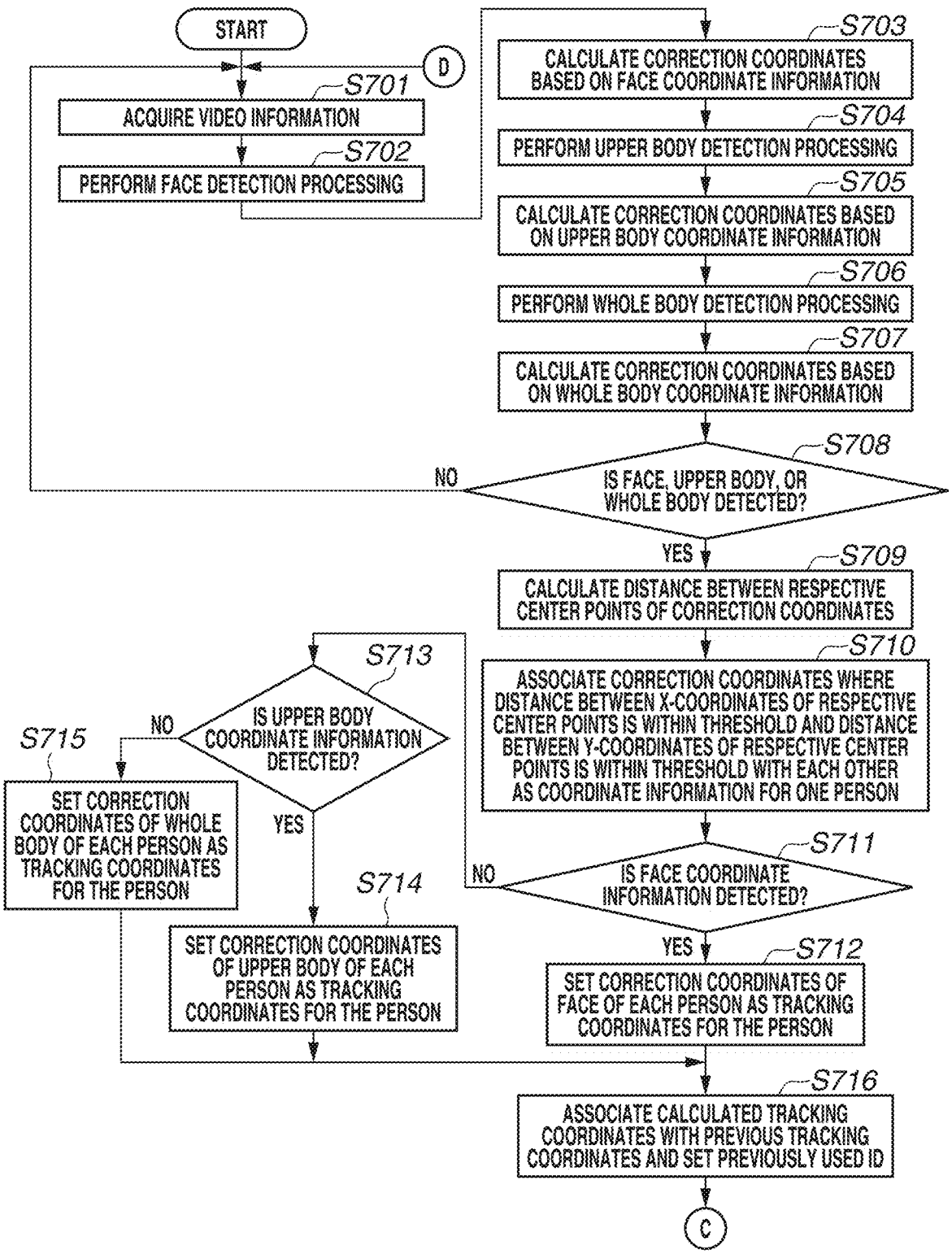
FIG. 7A is a flowchart illustrating an example of image capturing control processing according to the second exemplary embodiment.
Figure 7B:
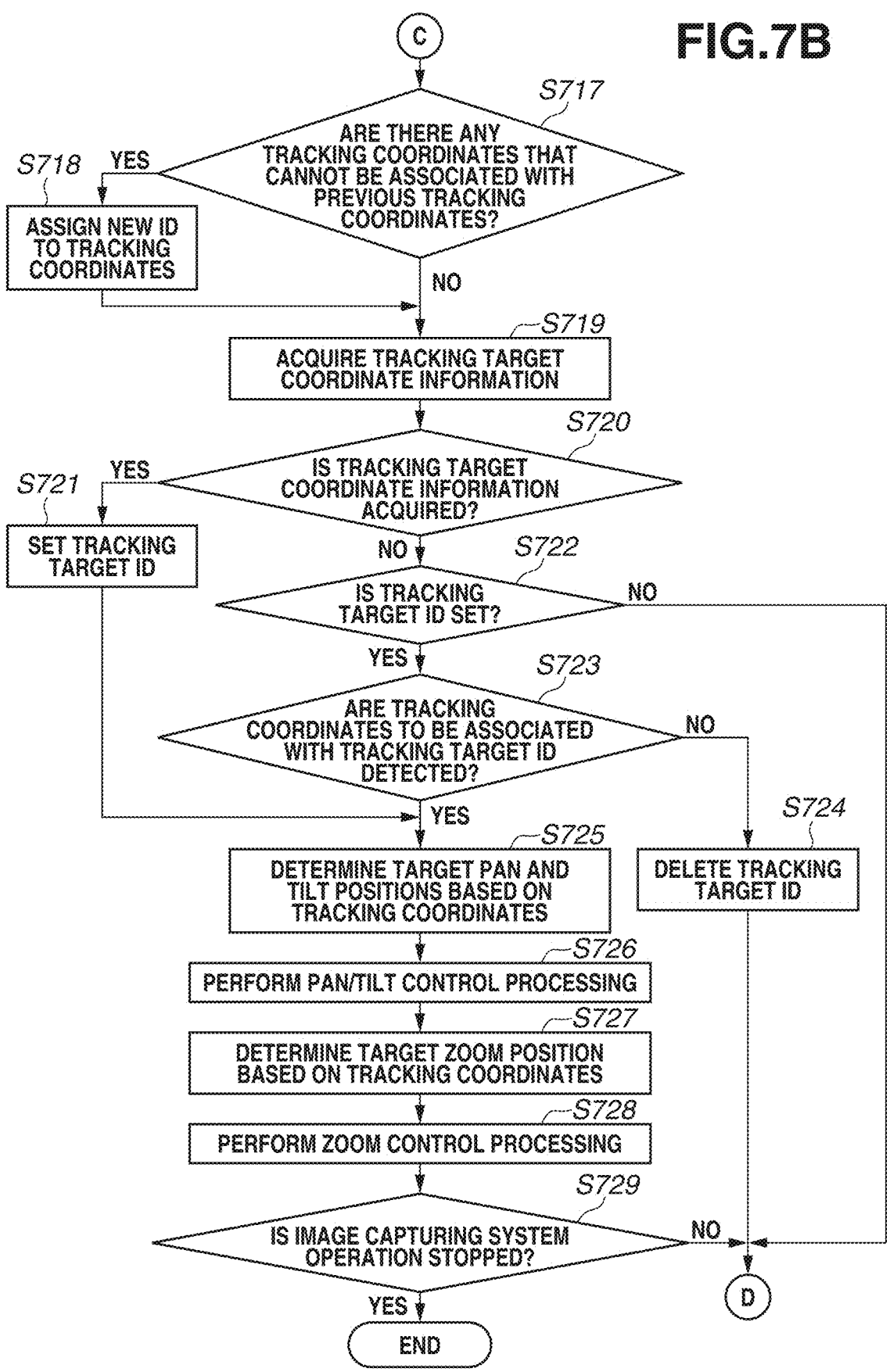
FIG. 7B is a flowchart illustrating an example of image capturing control processing according to the second exemplary embodiment.

Image capturing control processing performed in the image capturing system according to the present exemplary embodiment will be described with reference to FIGS. 7A and 7B. FIGS. 7A and 7B are a flowchart illustrating an example of image capturing control processing according to the present exemplary embodiment. As illustrated in FIG. 7A, when the image capturing system 100B is started by a user operation and automatic image capturing processing is started, in step S701, the video input unit 151 of the tracking apparatus 150B acquires video information from the video input apparatus 110.

In step S702, the first detection unit 152 of the tracking apparatus 150B analyzes the video image (image) input from the video input unit 151 and performs face detection processing on the video image. In step S703, the first correction unit 153 of the tracking apparatus 150B corrects the face coordinate information received from the first detection unit 152 at a preset magnification and relative position, thereby generating correction coordinates.

In step S704, the second detection unit 154 of the tracking apparatus 150B analyzes the video image (image) input from the video input unit 151 and performs upper body detection processing on the video image. In step S705, the second correction unit 155 of the tracking apparatus 150B corrects the upper body coordinate information received from the second detection unit 154 at a preset magnification and relative position, thereby generating correction coordinates.

In step S706, the third detection unit 156 of the tracking apparatus 150B analyzes the video image (image) input from the video input unit 151 and performs whole body detection processing on the video image. In step S707, the third correction unit 157 of the tracking apparatus 150B corrects the whole body coordinate information received from the third detection unit 156 at a preset magnification and relative position, thereby generating correction coordinates.

The processes in steps S702 to S707 related to face detection processing, upper body detection processing, and whole body detection processing on the object can be performed in no particular order. These processes may be performed in an order different from the order illustrated in FIG. 7A, or may be performed in parallel. The correction coordinates of each part may be generated after the processing of detecting each part is performed. For example, the face correction coordinates, the upper body correction coordinates, and the whole body correction coordinates of the object may be generated after all the processing of detecting the face, the upper body, and the whole body of the object is performed.

In step S708, the tracking coordinates generation unit 158B of the tracking apparatus 150B determines whether the face, the upper body, or the whole body of the object is detected within the angle of view. If the tracking coordinates generation unit 158B determines that the face, the upper body, or the whole body of the object is detected within the angle of view (YES in step S708), the processing proceeds to step S709. Otherwise (NO in step S708), the processing returns to step S701.

In step S709, the tracking coordinates generation unit 158B calculates the distance between the respective center points of the sets of correction coordinates calculated in steps S703, S705, and S707.

In step S710, the tracking coordinates generation unit 158B associates the correction coordinates where the distance between the X-coordinates of the center points is within the determination threshold (determination threshold in the lateral direction) and the distance between the Y-coordinates of the center points is within the determination threshold (determination threshold in the longitudinal direction) as coordinate information for one person with each other.

In step S711, the tracking coordinates generation unit 158B determines whether the face coordinate information for each person is detected. If the tracking coordinates generation unit 158B determines that the face coordinate information is detected (YES in step S711), the processing proceeds to step S712. Otherwise (NO in step S711), the processing proceeds to step S713.

In step S712, the tracking coordinates generation unit 158B sets the face correction coordinates as tracking coordinates for the person, and then the processing proceeds to step S716.

In step S713, the tracking coordinates generation unit 158B determines whether the upper body coordinate information for each person is detected. If the tracking coordinates generation unit 158B determines that the upper body coordinate information is detected (YES in step S713), the processing proceeds to step S714. Otherwise (NO in step S713), the processing proceeds to step S715.

In step S714, the tracking coordinates generation unit 158B sets the upper body correction coordinates as tracking coordinates for the person, and then the processing proceeds to step S716.

In step S715, the tracking coordinates generation unit 158B sets the whole body correction coordinates as tracking coordinates for the person, and then the processing proceeds to step S716.

In step S716, the ID assignment unit 159 of the tracking apparatus 150B associates the past tracking coordinates (previous tracking coordinates) with each set of tracking coordinates, and sets the previously used ID. Then, the processing proceeds to step S717 illustrated in FIG. 7B.

Next, in step S717, the ID assignment unit 159 determines whether there are any tracking coordinates that cannot be associated with the past tracking coordinates (previous tracking coordinates). If the ID assignment unit 159 determines that the currently generated tracking coordinates cannot be associated with the previous tracking coordinates (YES in step S717), the processing proceeds to step S718. If the ID assignment unit 159 determines that the currently generated tracking coordinates are associated with the previous tracking coordinates (NO in step S717), the processing proceeds to step S719.

In step S718, the ID assignment unit 159 assigns and sets anew ID to the tracking coordinates that cannot be associated with the past tracking coordinates (previous tracking coordinates), and then the processing proceeds to step S719.

In step S719, the ID assignment unit 159 acquires the coordinate information about the tracking target from the tracking target input unit 163.

In step S720, the ID assignment unit 159 determines whether the coordinate information about the tracking target is acquired from the tracking target input unit 163. If the ID assignment unit 159 determines that the coordinate information about the tracking target if acquired (YES in step S720), the processing proceeds to step S721. Otherwise (NO in step S720), the processing proceeds to step S722.

In step S721, the ID assignment unit 159 selects the tracking coordinates that are closest to the coordinate information about the tracking target acquired from the tracking target input unit 163, and sets the ID corresponding to the tracking coordinates as the tracking target ID. Then, the processing proceeds to step S725.

In step S722, the ID assignment unit 159 determines whether the tracking target ID is set. If the ID assignment unit 159 determines that the tracking target ID is set (YES in step S722), the processing proceeds to step S723. Otherwise (NO in step S722), the processing returns to step S701 illustrated in FIG. 7A.

In step S723, the ID assignment unit 159 determines whether tracking coordinates to be associated with the tracking target ID are detected. If the ID assignment unit 159 determines that tracking coordinates to be associated with the tracking target ID are detected (YES in step S723), the processing proceeds to step S725. Otherwise (NO in step S723), the processing proceeds to step S724.

In step S724, the ID assignment unit 159 deletes the set tracking target ID, and then the processing returns to step S701 illustrated in FIG. 7A.

In step S725, the target coordinates calculation unit 160B calculates the target pan and tilt positions for changing the image capturing range so that the tracking coordinates of the tracking target are located at a preset target position.

In step S726, the pan/tilt driving control unit 161 outputs a pan/tilt operation instruction for moving to the target pan and tilt positions calculated by the target coordinates calculation unit 160B to the pan/tilt driving apparatus 130, to thereby control the pan/tilt driving apparatus 130. As a result, the image capturing direction (image capturing range) of the video input apparatus 110 is controlled so that the object to be tracked can be captured at an appropriate position within the angle of view.

In step S727, the zoom position calculation unit 165 calculates the target zoom position so that the height of the area indicated by the tracking coordinates of the tracking target corresponds to a preset height within the angle of view.

In step S728, the zoom driving control unit 166 outputs a zoom operation instruction for moving to the target zoom position calculated by the zoom position calculation unit 165B to the zoom driving apparatus 190, to thereby control the zoom driving apparatus 190. As a result, the zoom magnification (image capturing range) of the video input apparatus 110 is controlled so that the object to be tracked can be captured with an appropriate size within the angle of view.

In step S729, the tracking apparatus 150B determines whether the image capturing system on/off switch (not illustrated) is operated by a user operation to stop the operation of the image capturing system. If the tracking apparatus 150B determines that an operation to stop the image capturing system is not performed (NO in step S729), the processing returns to step S701 illustrated in FIG. 7A. If the tracking apparatus 150B determines that an operation to stop the image capturing system is performed (YES in step S729), the operation of the image capturing system is completed.

As described above, the system for tracking a tracking target to capture it at an appropriate position within the angle of view and performing automatic image capturing detects a plurality of parts of an object through video analysis to identify the object to be tracked, and if at least one of the plurality of parts is detected, the system tracks the object based on the detected part, thereby improving the continuity of tracking. Further, tracking the object using coordinate information instead of image features enables continuous tracking even when the image features change due to, for example, changes in the orientation of the tracking target. Furthermore, to deal with characteristics of an upper body and a whole body, whose detected coordinates are likely to deviate in the longitudinal direction depending on the orientation and posture of the person, detected coordinates that deviate in the longitudinal direction are determined to be a result of a detected person. If the face of the object is successfully detected, the pan/tilt/zoom operation is controlled based on the coordinates of the face that are less likely to deviate as target coordinates, thereby improving the accuracy of controlling the angle of view.

Other Exemplary Embodiments

The present disclosure can also be implemented by processing in which a program for carrying out one or more functions according to the exemplary embodiments described above is supplied to a system or an apparatus via a network or a storage medium, and one or more processors in a computer of the system or the apparatus read out and run the program. The present disclosure can also be implemented by a circuit (e.g., an application specific integrated circuit (ASIC)) for carrying out one or more functions according to the exemplary embodiments.

The above-described exemplary embodiments are merely illustrative of embodiments for carrying out the present disclosure, and the technical scope of the present disclosure should not be interpreted in a limited way based on the exemplary embodiments. The present disclosure can be carried out in various forms without departing from the technical idea or main features of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-085337, filed May 20, 2021, which is hereby incorporated by reference herein in its entirety.

What is claimed is:

1. An image capturing control apparatus comprising:
a processor; and
a memory storing executable instructions which, when executed by the processor, cause the image capturing apparatus to perform operations including:
  detecting coordinates indicating each of a plurality of parts of an object from an image captured by an image capturing unit;
  correcting the detected coordinates to corrected coordinates for each of the plurality of parts calculated based on a preset magnification and relative position;
  generating tracking coordinates based on a plurality of the corrected coordinates each indicating different parts of the object and a distance of the plurality of the corrected coordinates, the distance being within a threshold; and
  controlling an image capturing range of the image capturing unit based on the generated tracking coordinates,
  wherein one object, where a distance between center points of the plurality of parts indicated by corrected coordinates included in the plurality of the corrected coordinates is within at least one threshold, is associated with the corrected coordinates, and average value of the associated corrected coordinates is set as the tracking coordinates for the one object.

2. The image capturing control apparatus according to claim 1, wherein executing the executable instructions causes the information processing apparatus to perform further operations including:
  detecting a coordinate indicating a face area of the object;
  detecting a coordinate indicating an upper body area of the object; and
  detecting a coordinate indicating a whole body area of the object.

3. The image capturing control apparatus according to claim 1,
  wherein the at least one threshold comprises a first threshold in a lateral direction and a second threshold in a longitudinal direction, the second threshold in the longitudinal direction being greater than the first threshold in the lateral direction,
  wherein the first threshold and the second threshold are set, and
  wherein one object is associated with the corrected coordinates where a distance in the lateral direction between the center points is within the first threshold and a distance in the longitudinal direction between the central points is within the second threshold.

4. The image capturing control apparatus according to claim 1, wherein the corrected coordinates for a part to which highest reliability is set as the tracking coordinates, the part being one of the plurality of parts of which coordinates indicating the each of the plurality of parts are detected.

5. The image capturing control apparatus according to claim 1, wherein, for each of the plurality of parts, the corrected coordinates are calculated by performing position correction processing on a center position of the detected coordinates at a preset relative position and performing scaling processing on a height and width of the detected coordinates at a preset magnification.

6. The image capturing control apparatus according to claim 1, wherein executing the executable instructions causes the information processing apparatus to perform further operations including setting a set of tracking coordinates which are included in the tracking coordinates generated based on the plurality of the objects as a tracking target, and wherein the image capturing range of the image capturing unit is controlled based on the tracking coordinates of the set tracking target.

7. The image capturing control apparatus according to claim 1, wherein the image capturing unit is instructed to perform at least one of a pan operation, a tilt operation, and/or a zoom operation such that the tracking coordinates of a tracking target are located at a predetermined position within the image capturing range of the image capturing unit.

8. The image capturing control apparatus according to claim 1, further comprising the image capturing unit, wherein the image capturing unit is configured to perform image capturing to generate an image.

9. An image capturing control method comprising:

detecting coordinates indicating each of a plurality of parts of an object from an image captured by an image capturing unit;

correcting the detected coordinates to corrected coordinates for each of the plurality of parts calculated based on a preset magnification and relative position;

generating a tracking coordinate based on a plurality of the corrected coordinates each indicating different parts of the object and a distance of the plurality of the corrected coordinates, the distance being within a threshold; and controlling an image capturing range of the image capturing unit based on the generated tracking coordinates, wherein one object, where a distance between center points of the plurality of parts indicated by corrected coordinates included in the plurality of the corrected coordinates is within at least one threshold, is associated with the corrected coordinates, and average value of the associated corrected coordinates is set as the tracking coordinates for the one object.

10. A non-transitory computer-readable storage medium storing a program for causing a computer to execute a method comprising:

detecting coordinates indicating each of a plurality of parts of an object from an image captured by an image capturing unit;

correcting the detected coordinates to corrected coordinates for each of the plurality of parts calculated based on a preset magnification and relative position;

generating a tracking coordinate based on a plurality of the corrected coordinates each indicating different parts of the object and a distance of the plurality of the corrected coordinates, the distance being within a threshold; and controlling an image capturing range of the image capturing unit based on the generated tracking coordinates, wherein one object, where a distance between center points of the plurality of parts indicated by corrected coordinates included in the plurality of the corrected coordinates is within at least one threshold, is associated with the corrected coordinates, and average value of the associated corrected coordinates is set as the tracking coordinates for the one object.

* * * * *